US012422780B2

(12) United States Patent
Kato

(10) Patent No.: US 12,422,780 B2
(45) Date of Patent: Sep. 23, 2025

(54) TIMEPIECE

(71) Applicant: SEIKO EPSON CORPORATION, Tokyo (JP)

(72) Inventor: Hideo Kato, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 320 days.

(21) Appl. No.: 18/345,586

(22) Filed: Jun. 30, 2023

(65) Prior Publication Data

US 2024/0004348 A1 Jan. 4, 2024

(30) Foreign Application Priority Data

Jul. 1, 2022 (JP) ................................ 2022-106882

(51) Int. Cl.
*G04B 45/02* (2006.01)
*G04B 19/06* (2006.01)
*G04B 45/00* (2006.01)

(52) U.S. Cl.
CPC ............ *G04B 45/02* (2013.01); *G04B 19/06* (2013.01); *G04B 45/0076* (2013.01)

(58) Field of Classification Search
CPC .... G04B 45/02; G04B 19/06; G04B 45/0076; G04B 15/14; G04B 19/065; G04B 19/10; G04B 13/02; G04B 1/16
See application file for complete search history.

(56) References Cited

U.S. PATENT DOCUMENTS

| | | | | |
|---|---|---|---|---|
| 5,515,607 A * | 5/1996 | Ikegami | B21K 23/00 | 74/432 |
| 7,433,273 B2 * | 10/2008 | Oguchi | G04C 3/008 | 368/46 |
| 2013/0051192 A1 * | 2/2013 | Oshio | G04B 19/04 | 368/205 |
| 2018/0348706 A1 * | 12/2018 | Koike | G04B 19/241 | |
| 2020/0073329 A1 * | 3/2020 | Semon | G04B 15/08 | |
| 2020/0292991 A1 | 9/2020 | Miyashita | | |

FOREIGN PATENT DOCUMENTS

JP 2020-148651 A 9/2020

* cited by examiner

*Primary Examiner* — Edwin A. Leon
(74) *Attorney, Agent, or Firm* — Harness, Dickey & Pierce, P.L.C.

(57) ABSTRACT

A timepiece includes a movement having a timepiece component, a first hand that has a first length and that is driven by the movement, a second hand that has a second length less than the first length and that is driven by the movement, a support plate provided on the movement, and a dial including a support plate provided on the movement and a sub-dial ring that displays an indicator related to the second hand. The support plate has a support plate ring member that is provided with a support plate opening and a support member that is coupled to the support plate inner circumference of the support plate ring member. The timepiece component is disposed below the support plate opening. The sub-dial ring is disposed on the support member. A cut-out portion is provided at an overlapping position that is above the timepiece component and that overlaps the timepiece component.

7 Claims, 7 Drawing Sheets

TIMEPIECE

The present application is based on, and claims priority from JP Application Serial Number 2022-106882, filed Jul. 1, 2022, the disclosure of which is hereby incorporated by reference herein in its entirety.

BACKGROUND

1. Technical Field

The present disclosure relates to a timepiece.

2. Related Art

There are known timepieces having a see-through structure. A timepiece described in JP 2020-148651 A has a configuration in which a part of the movement is visible from the dial side. The timepiece has a configuration in which an escape wheel and pinion, which is a timepiece component, disposed in the movement is visible. The dial is provided with a window through which a timepiece component is visible. The window is formed by cutting out a sub-dial corresponding to a small seconds dial. The sub-dial is on the same plane as the dial.

When a window and a sub-dial are provided on the same surface of a dial, too much of the sub-dial may be cut out by the window. When too much of the sub-dial is cut out, a user cannot easily confirm the indicators on the sub-dial, although the user can easily visually recognize a timepiece component.

SUMMARY

A timepiece according to an embodiment of the present disclosure includes a movement having a timepiece component, a first hand that has a first length and that is driven by the movement, a second hand that has a second length less than the first length and that is driven by the movement, a support plate provided on the movement, and a dial including a support plate provided on the movement and a sub-dial ring that displays an indicator related to the second hand, wherein the support plate has a support plate ring member that is provided with a support plate opening and a support member that is coupled to the support plate inner circumference of the support plate ring member, the timepiece component is disposed below the support plate opening, the sub-dial ring is disposed on the support member, and a cut-out portion is provided at an overlapping position that is above the timepiece component and that overlaps the timepiece component.

DESCRIPTION OF EXEMPLARY EMBODIMENTS

Figure 1:
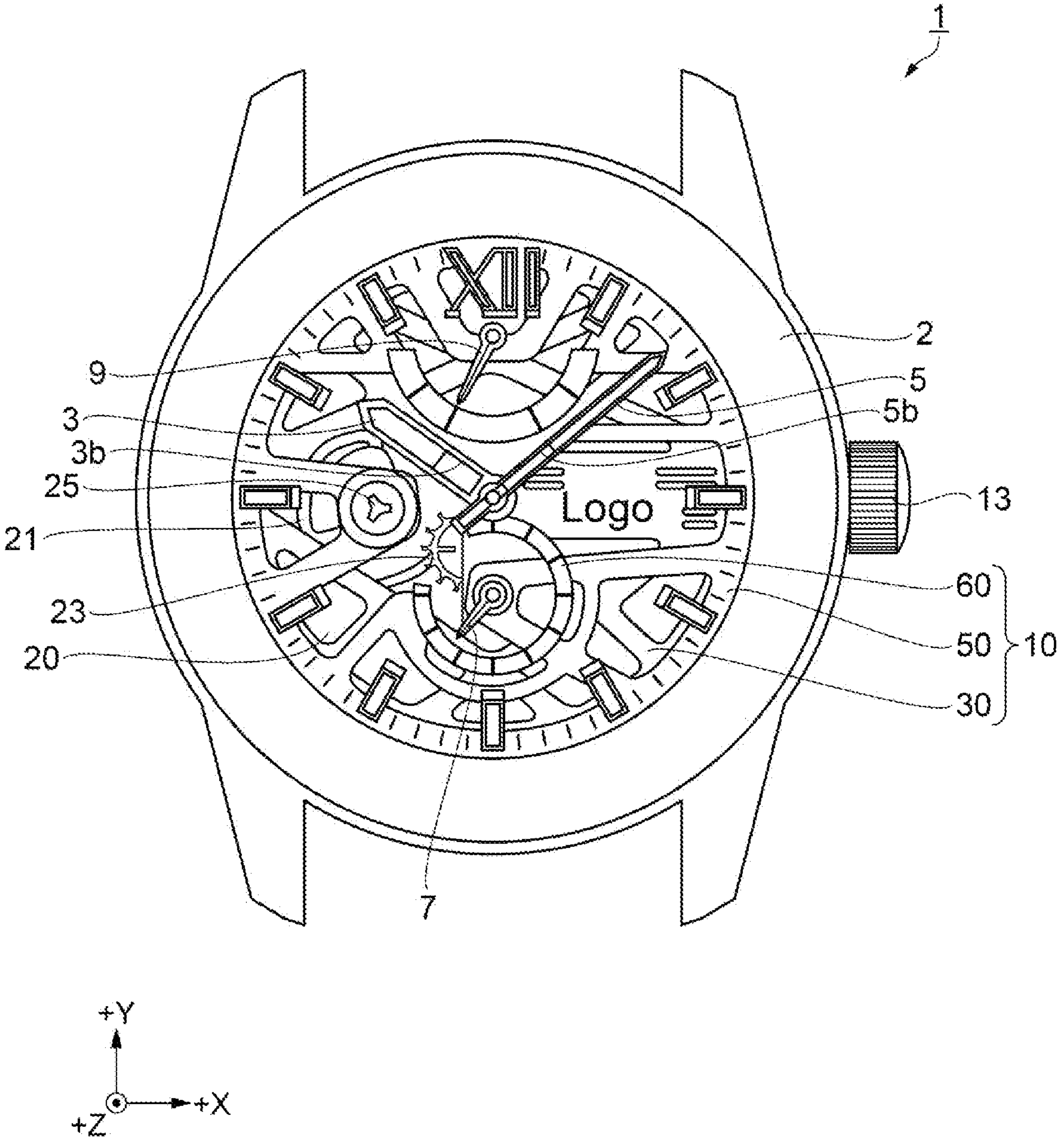
FIG. 1 is a diagram illustrating an external configuration of a mechanical timepiece.

FIG. 1 illustrates an external configuration of a timepiece 1. FIG. 1 is plan view of the timepiece 1 viewed from a direction facing a dial 10. The timepiece 1 is a mechanical timepiece powered by a mainspring (not illustrated). The timepiece 1 illustrated in FIG. 1 has a see-through structure in which a part of a timepiece interior component is visible. The timepiece 1 illustrated in FIG. 1 is a small seconds timepiece in which a seconds hand 7 is disposed at a position away from the central shaft.

Figures including FIG. 1 have an XYZ coordinate system. The X-axis is an axis parallel to a placement surface on which the timepiece 1 is placed. The X-axis is an axis parallel to a line coupling an hour mark **60*a* indicating 3 o'clock and an hour mark 60*a* indicating 9 o'clock of the timepiece 1. The hour marks 60*a* will be described later. An +X direction is a direction from the hour mark 60*a* indicating 9 o'clock toward the hour mark 60*a* indicating 3 o'clock. An −X direction is a direction from the hour mark 60*a* indicating 3 o'clock toward the hour mark 60*a* indicating 9 o'clock. The Y-axis is an axis parallel to the placement surface on which the timepiece 1 is placed. The Y-axis is an axis parallel to a line coupling a numerical mark 60*e* indicating 12 o'clock and an hour mark 60*a* indicating 6 o'clock of the timepiece 1. The numerical mark 60*e* will be described later. A +Y direction is a direction from the hour mark 60*a* indicating 6 o'clock toward the numerical mark 60*e*. A −Y direction is a direction from the numerical mark 60*e* toward the hour mark 60*a*** indicating 6 o'clock. The Z-axis is an axis perpendicular to the placement surface. A +Z direction is a direction upward from the placement surface. A −Z direction is a direction downward from the placement surface. The +Z direction corresponds to an upward direction. The −Z direction corresponds to a downward direction.

The timepiece 1 includes an outer case 2, an hour hand 3, a minute hand 5, the seconds hand 7, a power reserve hand 9, a crown 13, and the dial 10. The dial 10 includes a decorative dial 30, a parts support plate 50, and a functional part 60. Details of the dial 10 will be described later. The timepiece 1 illustrated in FIG. 1 has a configuration in which a balance with hairspring 21, an escape wheel and pinion 23, and a cap jewel 25 are visible. The balance with hairspring 21, the escape wheel and pinion 23, and the cap jewel 25 are timepiece interior components. The timepiece interior components each corresponds to an example of a timepiece component.

The outer case 2 accommodates the dial 10 and a movement 20 that will be described later. The outer case 2 accommodates the movement 20 and the dial 10 in this order in the +Z direction. Two openings are provided in the inner region of the outer case 2. Of the two openings, the opening in the +Z direction from the dial 10 is provided with a cover glass (not illustrated). Of the two openings, the opening in the −Z direction from the movement 20 is provided with a case back (not illustrated). The outer case 2 supports the dial 10 and the movement 20 in the inner region.

The hour hand 3 indicates time. The hour hand 3 illustrated in FIG. 1 is attached to an hour hand shaft **3*a* which is one of the hand shafts. The hour hand 3 is disposed in the +Z direction of the parts support plate 50. The hour hand 3 is driven by the movement 20. The hour hand 3 is configured to have a predetermined hour hand length. The hour hand 3 has an hour hand opening 3***b*. The hour hand opening 3*b* is provided in an area overlapping timepiece interior components that are visible along the Z-axis. The hour hand opening 3*b* illustrated in FIG. 1 is provided in an area overlapping the escape wheel and pinion 23 along the Z-axis. When the hour hand 3 is located at a position in the +Z direction of the escape wheel and pinion 23, a user can visually recognize the escape wheel and pinion 23 through the hour hand opening 3*b*. The hour hand opening 3*b* may be provided with a member having optical transparency. The hour hand 3 corresponds to an example of a first hand. The hour hand length corresponds to an example of a first length. The hour hand opening 3*b* corresponds to an example of a window.

The hour hand 3 is disposed in the +Z direction of the parts support plate 50, and has the hour hand opening 3*b* in an area overlapping timepiece interior components.

With the hour hand opening 3*b* provided, the user can visually recognize the escape wheel and pinion 23, which is one of the timepiece interior components, through the hour hand opening 3*b*.

The minute hand 5 indicates time. The minute hand 5 illustrated in FIG. 1 is attached to an hour hand shaft 3*a* which is one of the hand shafts. The minute hand 5 is disposed in the +Z direction of the parts support plate 50. The minute hand 5 is driven by the movement 20. The minute hand 5 is configured to have a predetermined minute hand length. The minute hand 5 may have a minute hand opening 5*b*. The minute hand opening 5*b* is provided in an area overlapping timepiece interior components that are visible along the Z-axis. The minute hand opening 5*b* illustrated in FIG. 1 is provided in an area overlapping the escape wheel and pinion 23 along the Z-axis. When the minute hand 5 is located at a position in the +Z direction of the escape wheel and pinion 23, the user can visually recognize the escape wheel and pinion 23 through the minute hand opening 5*b*. The minute hand opening 5*b* may be provided with a member having optical transparency. The minute hand 5 corresponds to an example of a first hand. The minute hand length corresponds to an example of a first length. The minute hand opening 5*b* corresponds to an example of a window.

The seconds hand 7 indicates time. The seconds hand 7 illustrated in FIG. 1 is attached to a seconds hand shaft 7*a* which is a hand shaft different from the hour hand shaft 3*a*. The seconds hand 7 is disposed in the +Z direction of the parts support plate 50. The seconds hand 7 is driven by the movement 20. The seconds hand 7 is configured to have a predetermined seconds hand length. The seconds hand length is less than the hour hand length. The seconds hand 7 corresponds to an example of a second hand. The seconds hand length corresponds to an example of a second length.

The power reserve hand 9 indicates the remaining power reserve. "Power reserve" refers to the amount of time from when the mainspring is fully wound until the mainspring unwinds and stops. The power reserve hand 9 is attached to a power reserve hand shaft 9*a* which is a hand shaft different from the hour hand shaft 3*a* and the seconds hand shaft 7*a*. The power reserve hand 9 is disposed in the +Z direction of the parts support plate 50. The power reserve hand 9 is driven by the movement 20. The power reserve hand 9 is configured to have a predetermined power reserve hand length. The power reserve hand length is less than the hour hand length.

The crown 13 is attached to the side surface of the outer case 2. The crown 13 receives operation from the user. The user operates the crown 13 to, for example, wind the mainspring or adjust the time.

The dial 10 is disposed in the inner region of the outer case 2. The dial 10 includes the decorative dial 30 and the parts support plate 50 that is provided on the decorative dial 30. The decorative dial 30 supports the parts support plate 50 directly or via another member. Details of the decorative dial 30 and the parts support plate 50 will be described later.

The balance with hairspring 21 controls the rate of movement of the hands of the timepiece 1. The balance with hairspring 21 adjusts the speed at which the mainspring unwinds. The balance with hairspring 21 is provided at a 9 o'clock position. The 9 o'clock position will be described later. The balance with hairspring 21 is an example of one of the timepiece interior components of the movement 20. The balance with hairspring 21 is disposed at a position visible from the +Z direction.

The escape wheel and pinion 23 is a component of an escapement. The escapement includes an escape wheel and pinion 23 and a pallet fork (not illustrated). The escapement exerts a reciprocating force on the balance with hairspring 21 and controls a gear train (not illustrated) with regular oscillations of the balance with hairspring 21. In plan view viewed from the +Z direction, the escape wheel and pinion 23 is disposed between the seconds hand shaft 7*a* and the balance with hairspring 21. The escapement is an example of one of the timepiece interior components of the movement 20. The escape wheel and pinion 23 is disposed at a position visible from the +Z direction.

The cap jewel 25 is provided on a balance staff which is the shaft of the balance with hairspring 21. The balance staff is not illustrated. The cap jewel 25 is provided at the end of the balance staff in the +Z direction. The cap jewel 25 is made of, for example, ruby. The cap jewel 25 is disposed at the 9 o'clock position of the timepiece 1. The cap jewel 25 is provided at a position visible from the +Z direction. A hole jewel is provided surrounding the cap jewel 25. The hole jewel is not illustrated. The hole jewel is a bearing that receives the balance staff. The hole jewel is made of, for example, ruby. The hole jewel may be disposed at a position visible from the +Z direction.

Figure 2:
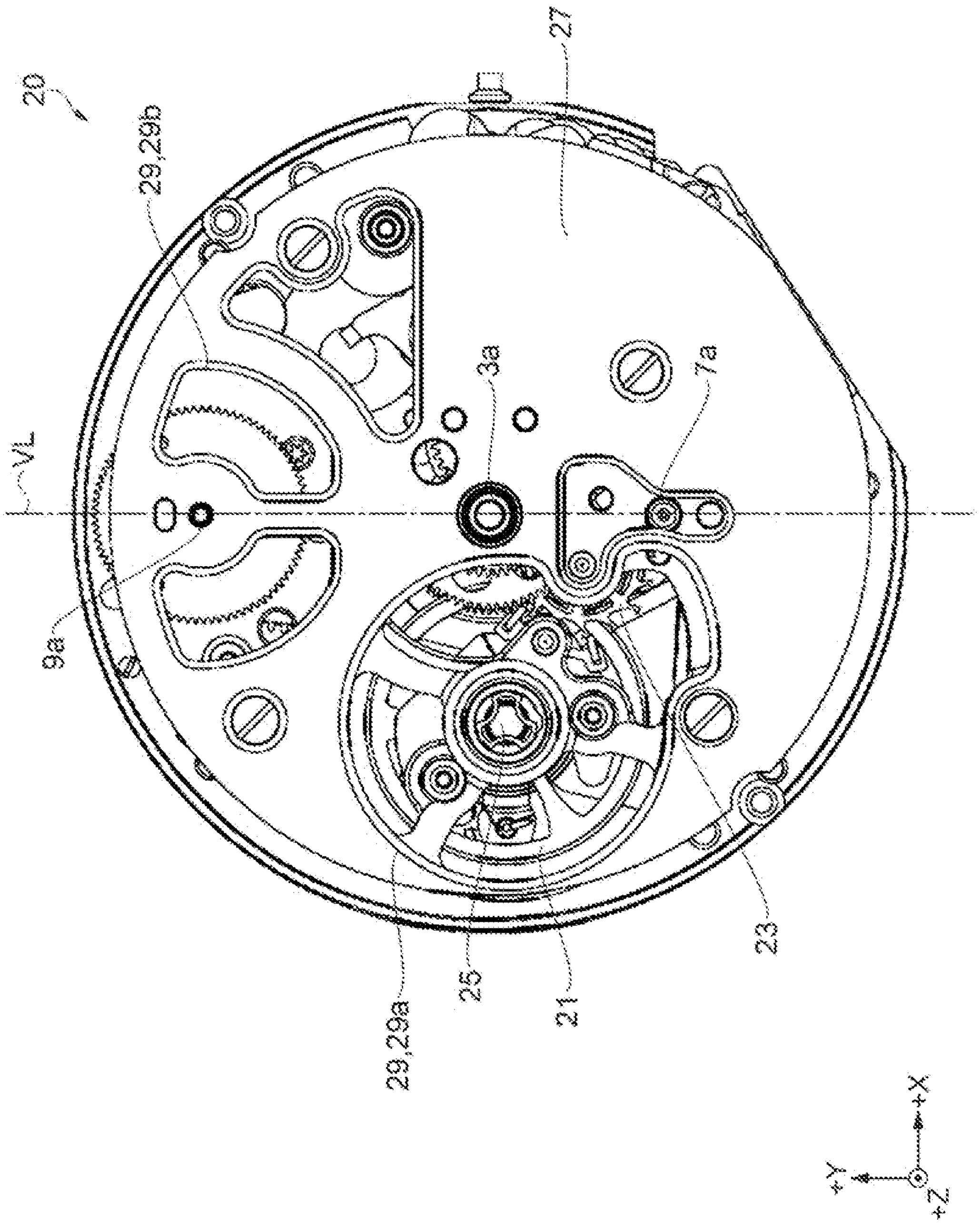
FIG. 2 is a diagram illustrating an external configuration of a movement.

FIG. 2 illustrates an external configuration of the movement 20. FIG. 2 is a diagram of the movement 20 installed in the timepiece 1 viewed from the +Z direction. The movement 20 illustrated in FIG. 2 is placed on the placement surface in an orientation in which an imaginary vertical line VL coupling the hour hand shaft 3*a* and the power reserve hand shaft 9*a* is parallel to the Y-axis.

The movement 20 includes the hour hand shaft 3*a*, the seconds hand shaft 7*a*, the power reserve hand shaft 9*a*, the balance with hairspring 21, the escape wheel and pinion 23, the cap jewel 25, and a movement cover 27. The movement 20 includes a timepiece interior component that is not illustrated, such as a movement barrel complete, a wheel and pinion, a pallet fork, a balance staff, a hole jewel, and a balance spring. The movement 20 may also have a timepiece interior component such as a date star indicator or a moon phase indicator.

The hour hand shaft 3*a* is a hand shaft to which the hour hand 3 and the minute hand 5 are attached. The hour hand shaft 3*a* is disposed at the center position or a substantially center position of the timepiece 1. The hour hand shaft 3*a* supports the hour hand 3 and the minute hand 5 in a position in the +Z direction of the dial 10.

The seconds hand shaft 7*a* is a hand shaft to which the seconds hand 7 is attached. The seconds hand shaft 7*a* is disposed at a position in the −Y direction of the hour hand shaft 3*a*. The seconds hand shaft 7*a* illustrated in FIG. 2 is disposed on the imaginary vertical line VL. The position of the seconds hand shaft 7*a* is not limited to a position in the −Y direction of the hour hand shaft 3*a*, but is preferably a position in the −Y direction of the hour hand shaft 3*a*. A position in the −Y direction of the hour hand shaft 3*a* is a 6 o'clock position. The 6 o'clock position is an area in the −Y direction of the hour hand shaft 3*a* defined by an imaginary line inclined at +45° to the imaginary vertical line VL and an imaginary line inclined at −45° to the imaginary vertical line VL. The seconds hand shaft 7*a* supports the seconds hand 7 in a position in the +Z direction of the dial 10.

The power reserve hand shaft 9*a* is a hand shaft to which the power reserve hand 9 is attached. The power reserve hand shaft 9*a* is disposed at a position in the +Y direction of the hour hand shaft 3*a*. The position of the power reserve hand shaft 9*a* is not limited to a position in the +Y direction of the hour hand shaft 3*a*, but is preferably a position in the +Y direction of the hour hand shaft 3*a*. A position of the hour hand shaft 3*a* in the +Y direction is a 12 o'clock position. The 12 o'clock position is an area in the +Y direction of the hour hand shaft 3*a* defined by an imaginary line inclined at +45° to the imaginary vertical line VL and an imaginary line inclined at −45° to the imaginary vertical line VL. The power reserve hand shaft 9*a* supports the power reserve hand 9 in a position in the +Z direction of the dial 10.

The balance with hairspring 21 and the cap jewel 25 are disposed at a position in the −X direction of imaginary vertical line VL. The cap jewel 25 and the center of the balance with hairspring 21 are disposed at the 9 o'clock position of the timepiece 1. The 9 o'clock position is an area in the −X direction of the imaginary vertical line VL defined by an imaginary line inclined at +45° to an imaginary horizontal line and an imaginary line inclined at −45° to the imaginary horizontal line, the imaginary horizontal line being a line that passes through the hour hand shaft 3*a* and that is perpendicular to the imaginary vertical line VL.

The escape wheel and pinion 23 is disposed at a position between the seconds hand shaft 7*a* and the balance with hairspring 21. The center of the escape wheel and pinion 23 is disposed at a position in the −X direction of the imaginary vertical line VL. The escape wheel and pinion 23 is disposed at a position adjacent to the balance with hairspring 21. Details of the escape wheel and pinion 23 will be described later.

The movement cover 27 is an exterior member that covers the timepiece interior components. A part of the movement cover 27 is provided at a position in the +Z direction of the timepiece interior components. The movement cover 27 is provided with a movement opening 29. The movement cover 27 corresponds to an example of a cover. The movement opening 29 corresponds to an example of an opening.

The movement opening 29 has a configuration in which timepiece interior components are visible. The movement opening 29 illustrated in FIG. 2 has a plurality of opening areas including a first movement opening area 29*a* and a second movement opening area 29*b*. The movement opening 29 has a plurality of opening areas, but is not limited thereto. The movement opening 29 may have one opening area.

The first movement opening area 29*a* is provided at a position in the −X direction of the imaginary vertical line VL. The first movement opening area 29*a* is provided at the 9 o'clock position of the timepiece 1. The first movement opening area 29*a* is provided at a position in the +Z direction of the balance with hairspring 21, the escape wheel and pinion 23, and the cap jewel 25. The movement 20 has the balance with hairspring 21, the escape wheel and pinion 23, and the cap jewel 25 at positions in the −Z direction of the first movement opening area 29*a*. The first movement opening area 29*a* is provided at a position where a part of the escape wheel and pinion 23 is visible. With the first movement opening area 29*a* provided, the user can visually recognize timepiece interior components, such as the balance with hairspring 21, the escape wheel and pinion 23, and the cap jewel 25.

The second movement opening area 29*b* is provided at a position in the +X direction of the imaginary vertical line VL. The second movement opening area 29*b* is provided at a position different from the position of the first movement opening area 29*a*. The second movement opening area 29*b* is provided at a position where a timepiece interior component related to driving of the power reserve hand 9 is visible.

Figure 3:
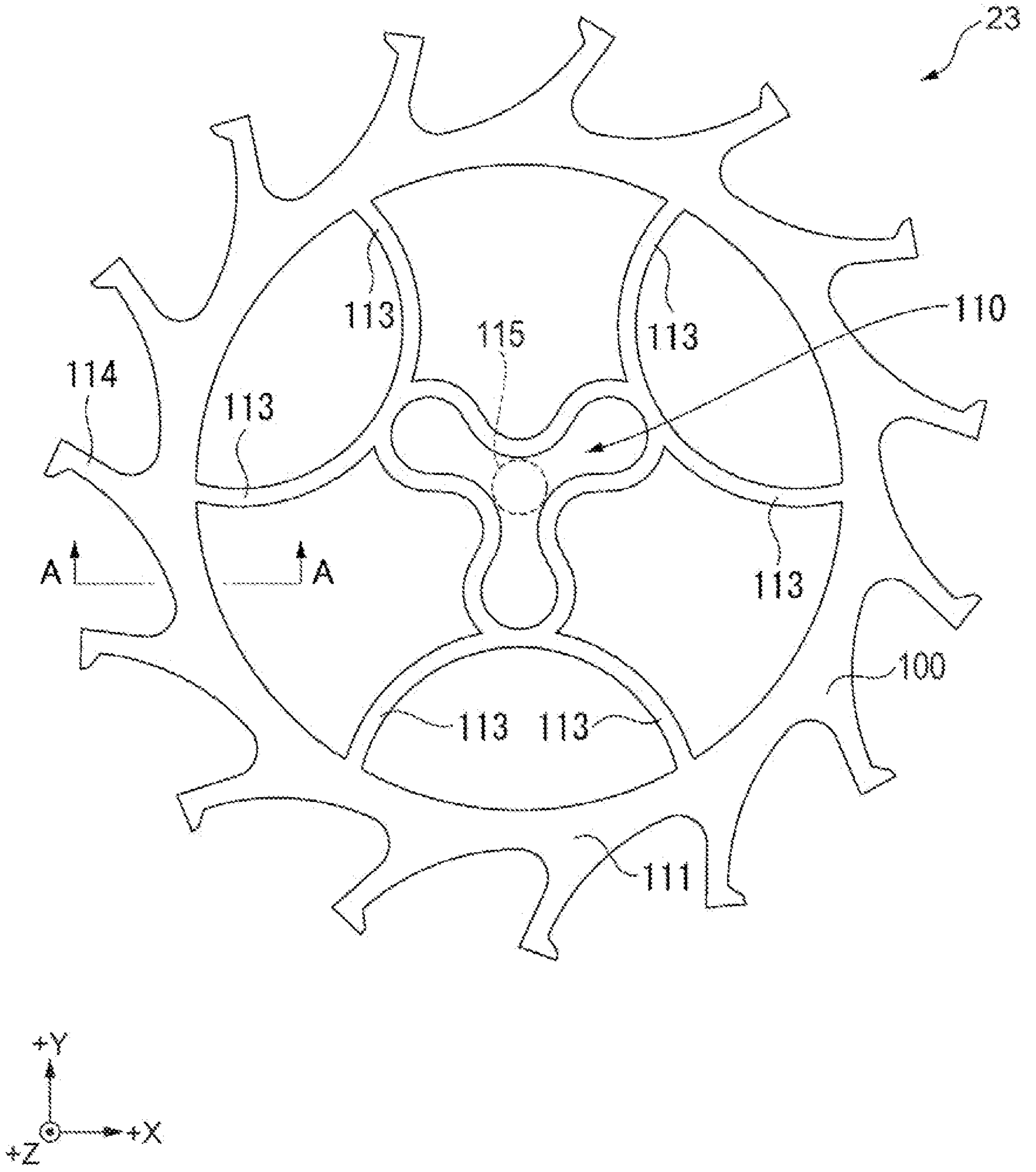
FIG. 3 is a diagram illustrating a schematic configuration of an escape wheel and pinion.

FIG. 3 illustrates a schematic configuration of the escape wheel and pinion 23. FIG. 3 is a diagram of the escape wheel and pinion 23 viewed from the +Z direction. The escape wheel and pinion 23 is provided with a holding portion 110, a rim portion 111, an elastic portion 113, and a tooth portion 114. The escape wheel and pinion 23 has a light reflection layer 100 on its surface. The light reflection layer 100 will be described later.

The holding portion 110 is disposed at the central portion of the escape wheel and pinion 23. The holding portion 110 has a through hole penetrating the holding portion 110 along the Z-axis. A support shaft 115 that supports the escape wheel and pinion 23 is inserted into the through hole. The support shaft 115 is provided inside the movement 20. The holding portion 110 holds the support shaft 115.

The rim portion 111 is a ring-shaped member disposed on the outer circumferential edge of the escape wheel and pinion 23. The rim portion 111 is coupled to the elastic portion 113 at the inner circumferential portion of the rim portion 111. The rim portion 111 is coupled to the tooth portion 114 at the outer circumferential portion of the rim portion 111.

The elastic portion 113 is disposed between the holding portion 110 and the rim portion 111. The elastic portion 113 couples the holding portion 110 and the rim portion 111. The elastic portion 113 illustrated in FIG. 3 is formed of an arc-shaped member, but is not limited thereto. The elastic portion 113 may have a spoke shape.

The tooth portion 114 is disposed on the outer circumferential portion of the rim portion 111. A plurality of the tooth portions 114 are disposed on the outer circumferential portion of the rim portion 111. The tooth portion 114 engages with a pallet fork (not illustrated). The tooth portion 114 engages with the pallet fork, and thus the pallet fork controls the movement of the escape wheel and pinion 23.

Figure 4:
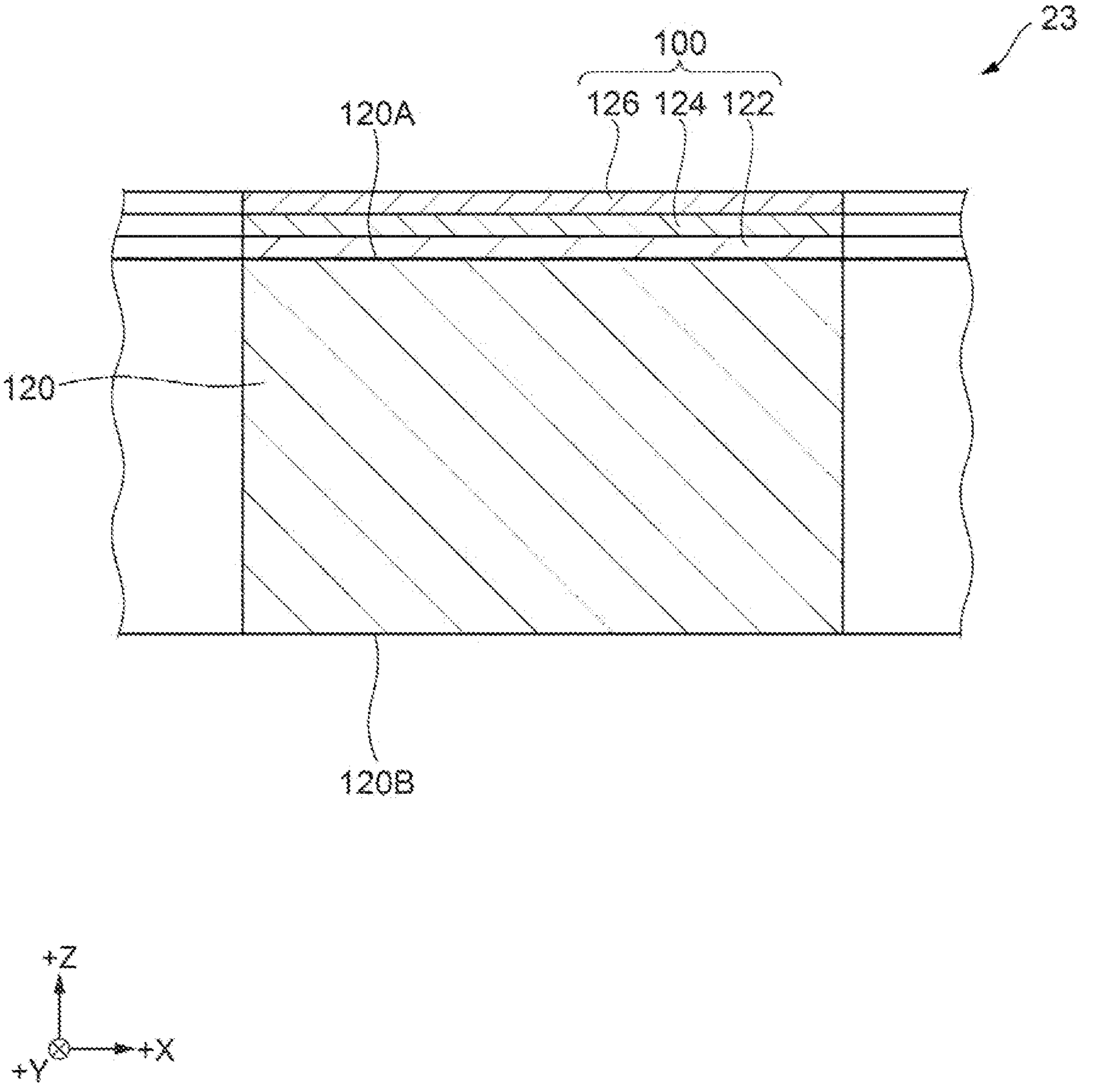
FIG. 4 is a diagram illustrating a part of a cross section of an escape wheel and pinion.

FIG. 4 illustrates a configuration of a part of a cross section of the escape wheel and pinion 23. FIG. 4 illustrates a part of a cross section along a line A-A illustrated in FIG. 3. The escape wheel and pinion 23 is provided with a base material 120 and the light reflection layer 100 along the Z-axis.

The base material 120 mainly contains silicon. The base material 120 contains 80 mass % or greater of silicon with respect to the entire base material. The silicon content of the base material 120 is more preferably 90 mass % or greater, and even more preferably 95 mass % or greater. The base material 120 has a first surface 120A and a second surface 120B. The first surface 120A is a surface of the base material 120 in the +Z direction. The second surface 120B is a surface of the base material 120 in the −Z direction.

The light reflection layer 100 is provided at the first surface 120A of the base material 120. With the light reflection layer 100 provided, the escape wheel and pinion 23 has an improved decorativeness. The light reflection layer 100 includes a first silicon oxide layer 122, a silicon layer 124, and a second silicon oxide layer 126 in this order at the first surface 120A. With the light reflection layer 100 configured to have a three-layer structure, the escape wheel and pinion 23 has an improved color developability, giving the escape wheel and pinion 23 an even better decorativeness. An average thickness of the light reflection layer 100 can be set as appropriate, but is preferably from 265 nm to 885 nm.

The first silicon oxide layer 122 is provided at the base material 120. An average thickness of the first silicon oxide layer 122 can be adjusted as appropriate, but is, for example, from 100 nm to 450 nm. When the escape wheel and pinion 23 is colored blue, the average thickness of the first silicon oxide layer 122 is preferably from 20 nm to 100 nm. When the escape wheel and pinion 23 is colored blue, the average thickness of the first silicon oxide layer 122 may also be from 180 nm to 290 nm. The first silicon oxide layer 122 corresponds to an example of a silicon oxide layer.

The silicon layer 124 is provided at the first silicon oxide layer 122. The silicon layer 124 may be an amorphous layer or a polysilicon layer. The silicon layer 124 is preferably a polysilicon layer. An average thickness of the silicon layer 124 is preferably from 66 nm to 86 nm. When the escape wheel and pinion 23 is colored blue, the average thickness of the silicon layer 124 is preferably from 70 nm to 84 nm.

The second silicon oxide layer 126 is provided at the silicon layer 124. An average thickness of the second silicon oxide layer 126 is preferably less than the average thickness of the first silicon oxide layer 122. When the escape wheel and pinion 23 is colored blue, the average thickness of the second silicon oxide layer 126 is preferably from 100 nm to 200 nm. When the escape wheel and pinion 23 is colored blue, the average thickness of the second silicon oxide layer 126 may also be from 250 nm to 360 nm. The second silicon oxide layer 126 corresponds to an example of a silicon oxide layer.

The timepiece interior component is preferably the escape wheel and pinion 23 that includes the first silicon oxide layer 122 and the second silicon oxide layer 126.

With the escape wheel and pinion 23 including the first silicon oxide layer 122 and the second silicon oxide layer 126, the escape wheel and pinion 23 develops a predetermined color. With the escape wheel and pinion 23 developing a predetermined color, the dial 10 has an improved decorativeness. In addition, with the escape wheel and pinion 23 being made of silicon, the timepiece 1 has an improved power reserve.

Figure 5:
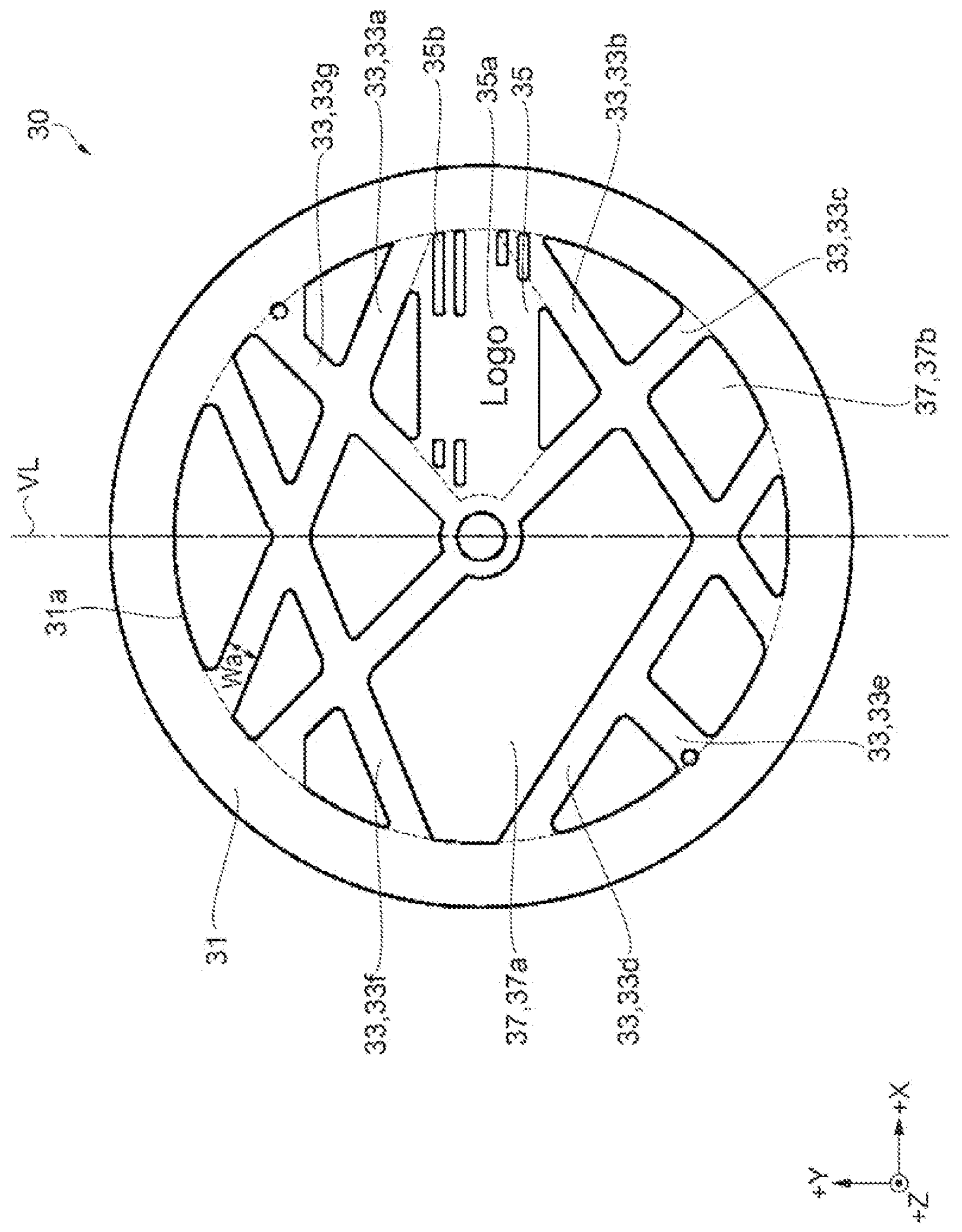
FIG. 5 is a diagram illustrating a schematic configuration of a decorative dial.

FIG. 5 illustrates a schematic configuration of the decorative dial 30. FIG. 5 is a diagram of the decorative dial 30 viewed from the +Z direction. FIG. 5 illustrates the decorative dial 30 in a position installed on the timepiece 1. The decorative dial 30 is provided at a position in the +Z direction of the movement 20. The decorative dial 30 is provided between the movement 20 and the parts support plate 50 along the Z-axis. The decorative dial 30 includes a decorative dial ring 31, a beam member 33, and an image display plate 35. The decorative dial 30 is configured to have a predetermined color. The decorative dial 30 is preferably configured to have a dark color such as black. With the decorative dial 30 configured to have a dark color, the perceived depth of the dial is increased when the parts support plate 50 is disposed on the decorative dial 30. The decorative dial 30 corresponds to an example of a decorative plate.

The decorative dial ring 31 is disposed on the outer circumferential edge of the decorative dial 30. The decorative dial ring 31 is supported by the outer case 2 or the movement 20. The decorative dial ring 31 has a decorative dial inner circumferential surface 31*a* at the inner circumferential portion. The inside of the decorative dial inner circumferential surface 31*a* is a decorative dial opening 37. The decorative dial ring 31 illustrated in FIG. 5 is a circular ring, but the decorative dial ring 31 is not limited to a circular ring. The shape of the decorative dial ring 31 is not limited as long as the decorative dial ring 31 has an opening at the inner circumferential portion. The decorative dial ring 31 may have a rectangular shape. The decorative dial ring 31 corresponds to an example of a decorative plate ring member. The decorative dial inner circumferential surface 31*a* corresponds to an example of a decorative plate inner circumference.

The beam member 33 is coupled to the decorative dial inner circumferential surface 31*a* of the decorative dial ring 31. In FIG. 5, a plurality of the beam members 33 are coupled to the decorative dial inner circumferential surface 31*a*. The beam member 33 is a plate-shaped member coupling any two points on the decorative dial inner circumferential surface 31*a*, or a plate-shaped member coupling the decorative dial inner circumferential surface 31*a* with another beam member 33. The beam member 33 may also be a plate-shaped member coupling another two beam members 33. A beam member width Wa of the beam member 33 can be set as appropriate. The beam member width Wa of the beam member 33 may change depending on the position. The beam member widths Wa of the plurality of the beam members 33 may be different from each other. A thickness of the beam member 33 along the Z-axis is the same as a thickness of the decorative dial ring 31 along the Z-axis, but is not limited thereto. The thickness of the beam member 33 along the Z-axis may be greater or less than the thickness of the decorative dial ring 31 along the Z-axis. The beam member 33 and the decorative dial ring 31 are formed as one piece. The beam member 33 corresponds to an example of a plate member. The beam member width Wa corresponds to an example of a width of a plate member.

The plurality of the beam members 33 illustrated in FIG. 5 are a first beam member 33*a*, a second beam member 33*b*, a third beam member 33*c*, a fourth beam member 33*d*, a fifth beam member 33*e*, a sixth beam member 33*f*, and a seventh beam member 33*g*. The number of the beam members 33 illustrated in FIG. 5 is seven, but the number of the beam members 33 is not limited thereto. The number of the beam members 33 may be six or less, or may be eight or more.

The first beam member 33*a*, the second beam member 33*b*, the third beam member 33*c*, the fourth beam member 33*d*, and the sixth beam member 33*f* couple two points on the decorative dial inner circumferential surface 31*a*. The beam member width Wa of the first beam member 33*a* is constant throughout the entire length of the first beam member 33*a*. A ring portion is formed at the center of the third beam member 33*c*. The ring portion is provided at the center position of the decorative dial 30. The hour hand shaft 3*a* to which the hour hand 3 and the minute hand 5 are attached is inserted into the ring portion. The first beam member 33*a* and the sixth beam member 33*f* are disposed at positions that are symmetrical with respect to the imaginary vertical line VL. The imaginary vertical line VL is an axis parallel to the Y-axis passing through the center of the decorative dial 30. The second beam member 33*b* and the fourth beam member 33*d* are disposed at positions that are symmetrical with respect to the imaginary vertical line VL.

The fifth beam member 33*e* and the seventh beam member 33*g* couple the decorative dial inner circumferential surface 31*a* and the beam member 33. The fifth beam member 33*e* couples the decorative dial inner circumferential surface 31*a* and the fourth beam member 33*d*. The seventh beam member 33*g* couples the decorative dial inner circumferential surface 31*a* and the third beam member 33*c*. The fifth beam member 33*e* is disposed at a position on the extension from the seventh beam member 33*g*.

The image display plate 35 is supported by the beam member 33 and the decorative dial inner circumferential surface 31*a*. The image display plate 35 illustrated in FIG. 5 is supported by the first beam member 33*a*, the second beam member 33*b*, the third beam member 33*c*, and the seventh beam member 33*g*. The image display plate 35 and the plurality of the beam members 33 are formed as one piece. The image display plate 35 corresponds to an example of a display plate.

A display image 35*a* is displayed on the image display plate 35. The display image 35*a* includes a logotype indicating the brand name, the manufacturer name, or other information about the timepiece 1, or a logomark that can be used to identify the brand. The display image 35*a* may include a plurality of text strings, designs, and the like. The display image 35*a* corresponds to an example of an identification image.

A plurality of slits 35*b* are formed in the image display plate 35. The slits 35*b* are provided at positions different from the position of the display image 35*a*. The plurality of slits 35*b* may be not provided, but are preferably provided. With the slits 35*b* provided, the dial 10 has improved design variation.

The decorative dial opening 37 is divided into a plurality of areas by the beam member 33. The decorative dial opening 37 is divided into a plurality of areas including a first decorative dial opening area 37*a* and a second decorative dial opening area 37*b*. The first decorative dial opening area 37*a* and the second decorative dial opening area 37*b* are a part of the decorative dial opening 37. The decorative dial opening 37 corresponds to an example of a decorative plate opening.

The first decorative dial opening area 37*a* is provided at a position in the +Z direction of the first movement opening area 29*a* illustrated in FIG. 2. The first decorative dial opening area 37*a* is an area including the positions of a part of the balance with hairspring 21, a part of the escape wheel and pinion 23, and the cap jewel 25 in the +Z direction. The second decorative dial opening area 37*b* is provided at a position in the +Z direction of the movement cover 27. The second decorative dial opening area 37*b* is an area including the position of the movement cover 27 in the +Z direction.

Figure 6:
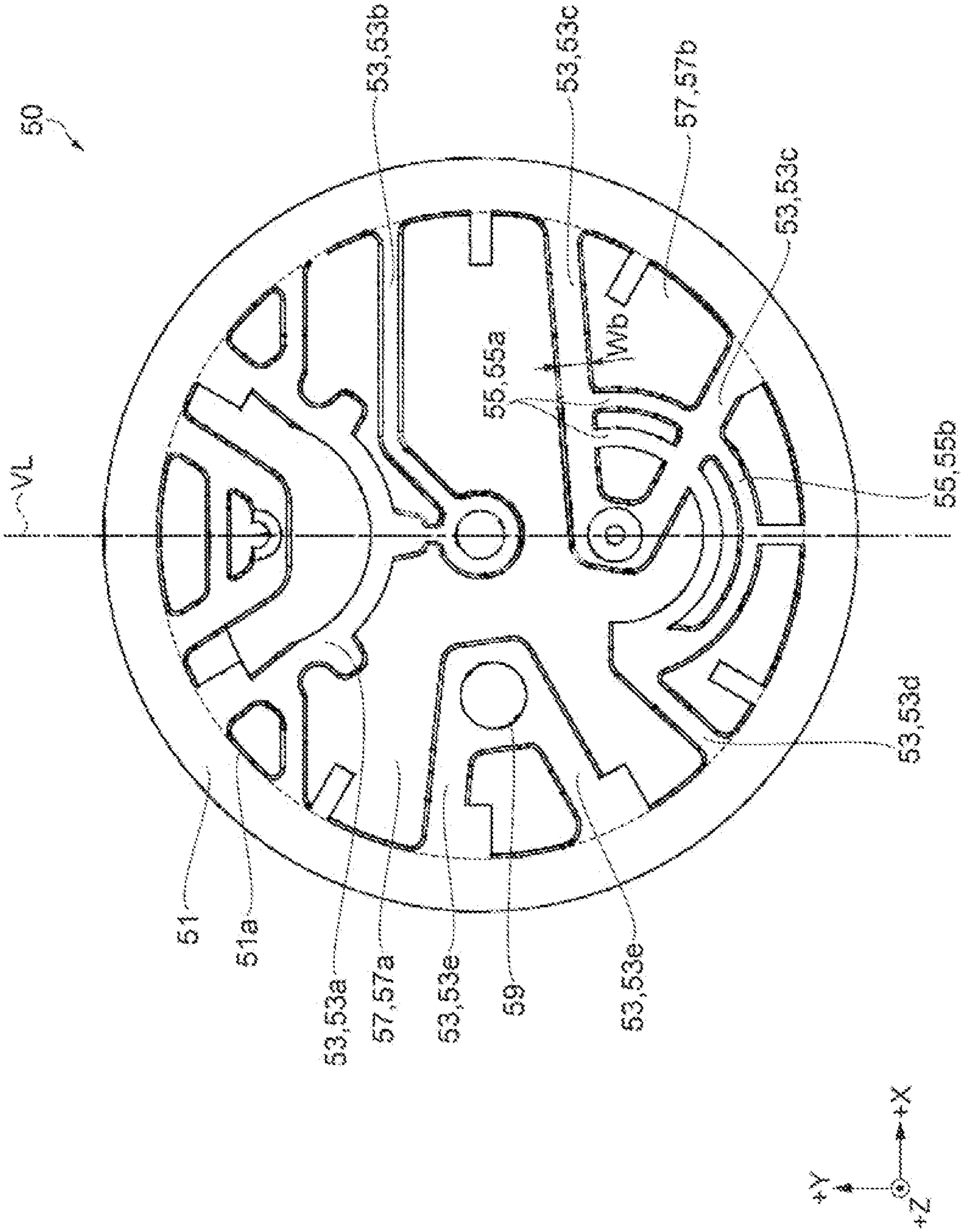
FIG. 6 is a diagram illustrating a schematic configuration of a parts support plate.

FIG. 6 illustrates a schematic configuration of the parts support plate 50. FIG. 6 is a diagram of the parts support plate 50 viewed from the +Z direction. FIG. 6 illustrates the parts support plate 50 in a position installed on the timepiece 1. The parts support plate 50 is provided at a position in the +Z direction of the movement 20 and the decorative dial 30. The parts support plate 50 is provided with a parts support plate ring 51, a plurality of bridges 53, and an auxiliary member 55. The parts support plate 50 corresponds to an example of a support plate.

The color of the parts support plate 50 is preferably different from the color of the decorative dial 30. For example, the color of the decorative dial 30 is a dark color while the color of the parts support plate 50 is a light color. Alternatively, the color of the decorative dial 30 may be black, which is an example of a dark color, while the color of the parts support plate 50 may be a dark color different from the black color of the decorative dial 30. With the color of the decorative dial 30 being different from the color of the parts support plate 50, the dial 10 has an improved three-dimensional effect. The black color and the dark color correspond to an example of a first color. The light color or the dark color different from the black color corresponds to an example of a second color.

The parts support plate ring 51 is disposed at the outer circumferential edge of the parts support plate 50. The parts support plate ring 51 is supported by the decorative dial 30. The parts support plate ring 51 has a parts support plate inner circumferential surface 51*a* at the inner circumferential portion. The inside of the parts support plate inner circumferential surface 51*a* is a parts support plate opening 57. The parts support plate ring 51 illustrated in FIG. 6 has a circular shape, but the shape of the parts support plate ring 51 is not limited to a circular shape. The shape of the parts support plate ring 51 is not limited as long as the parts support plate ring 51 has an opening at the inner circumferential portion. The parts support plate ring 51 may have a rectangular shape. The shape of the parts support plate ring 51 is preferably the same as the shape of the decorative dial ring 31. The parts support plate ring 51 corresponds to an example of a support plate ring member. The parts support plate inner circumferential surface 51*a* corresponds to an example of a support plate inner circumference.

The bridge 53 supports the functional part 60 that will be described later. The bridge 53 is coupled to the parts support plate inner circumferential surface 51*a* of the parts support plate ring 51. In FIG. 6, a plurality of the bridges 53 are coupled to the parts support plate inner circumferential surface 51*a*. The two ends of the bridge 53 are coupled to the parts support plate inner circumferential surface 51*a*. One of the two ends of the bridge 53 may be coupled to the parts support plate inner circumferential surface 51*a* while the other end may be not coupled to the parts support plate inner circumferential surface 51*a*. The two ends of the bridge 53 may be coupled to the parts support plate inner circumferential surface 51*a* and another bridge 53. A thickness of the bridge 53 along the Z-axis is the same as a thickness of the parts support plate ring 51 along the Z-axis, but is not limited thereto. The thickness of the bridge 53 along the Z-axis may be greater or less than the thickness of the parts support plate ring 51 along the Z-axis. The bridge 53 and the parts support plate ring 51 are formed as one piece. The bridge 53 corresponds to an example of a support member.

The plurality of the bridges 53 include a first bridge 53*a*, a second bridge 53*b*, a third bridge 53*c*, a fourth bridge 53*d*, and a fifth bridge 53*e*. The number of the bridges 53 is not limited to five. The number of the bridges 53 may be any from one to four, or may be six or more. The bridge 53 is disposed in a position corresponding to the position where the functional part 60 is disposed.

The two ends of the first bridge 53*a*, the third bridge 53*c*, and the fifth bridge 53*e* are supported by the parts support plate inner circumferential surface 51*a*. The first bridge 53*a* is configured to have an arc portion. The third bridge 53*c* is configured to have a V shape. The third bridge 53*c* is provided with an insertion hole. The seconds hand shaft 7*a* is inserted into the insertion hole. The fifth bridge 53*e* is provided with an attachment hole 59. The functional part 60 is attached to the attachment hole 59.

The two ends of the second bridge **53*b* and the fourth bridge 53*d* are coupled to the parts support plate inner circumferential surface 51*a* and another bridge 53. The two ends of the second bridge 53*b* are coupled to the parts support plate inner circumferential surface 51*a* and the first bridge 53*a*. The second bridge 53*b* is configured to have a ring portion. The ring portion is disposed at the center of the parts support plate 50. The hour hand shaft 3*a* is inserted into the ring portion. The fourth bridge 53*d* couples the parts support plate ring 51 and the third bridge 53*c*. The fourth bridge 53*d*** is configured to have an arc portion.

A bridge width Wb of the bridge 53 can be set as appropriate. As illustrated in FIG. 6, the bridge width Wb of the second bridge **53*b* is less than the bridge width Wb of the fifth bridge 53*e*. With the bridge widths Wb of the bridges 53 being different from each other, the dial 10 has improved design variation. The bridge widths Wb of the bridges 53** may be unvaried. The bridge width Wb corresponds to an example of a width of a support member.

The two ends of the auxiliary member 55 are coupled to the bridge 53. The auxiliary member 55 modifies the bridge 53. The auxiliary member 55 may reinforce the bridge 53. A plurality of the auxiliary members 55 include a first auxiliary member **55*a* and a second auxiliary member 55*b*. The first auxiliary member 55*a* is coupled to the third bridge 53*c*. The second auxiliary member 55*b* is coupled to the third bridge 53*c* and the fourth bridge 53*d*. The first auxiliary member 55*a* and the second auxiliary member 55*b* may be provided or may be not provided. An auxiliary member 55 different from the first auxiliary member 55*a* and the second auxiliary member 55*b* may be provided. The auxiliary member 55 and the bridge 53** are formed as one piece.

The parts support plate opening 57 is divided into a plurality of areas by the bridge 53. The parts support plate opening 57 is divided into a plurality of areas including a first parts support plate opening area **57*a* and a second parts support plate opening area 57*b*. The first parts support plate opening area 57*a* and the second parts support plate opening area 57*b* are a part of the parts support plate opening 57. The parts support plate opening 57** corresponds to an example of a support plate opening.

The first parts support plate opening area **57*a* is provided at a position in the +Z direction with respect to the movement opening 29. The first parts support plate opening area 57*a* is provided at a position in the +Z direction with respect to a part of the balance with hairspring 21 and a part of the escape wheel and pinion 23. The first parts support plate opening area 57*a* is provided at a position in the +Z direction of the image display plate 35. The second parts support plate opening area 57*b* is provided at a position in the +Z direction of the movement cover 27**.

Figure 7:
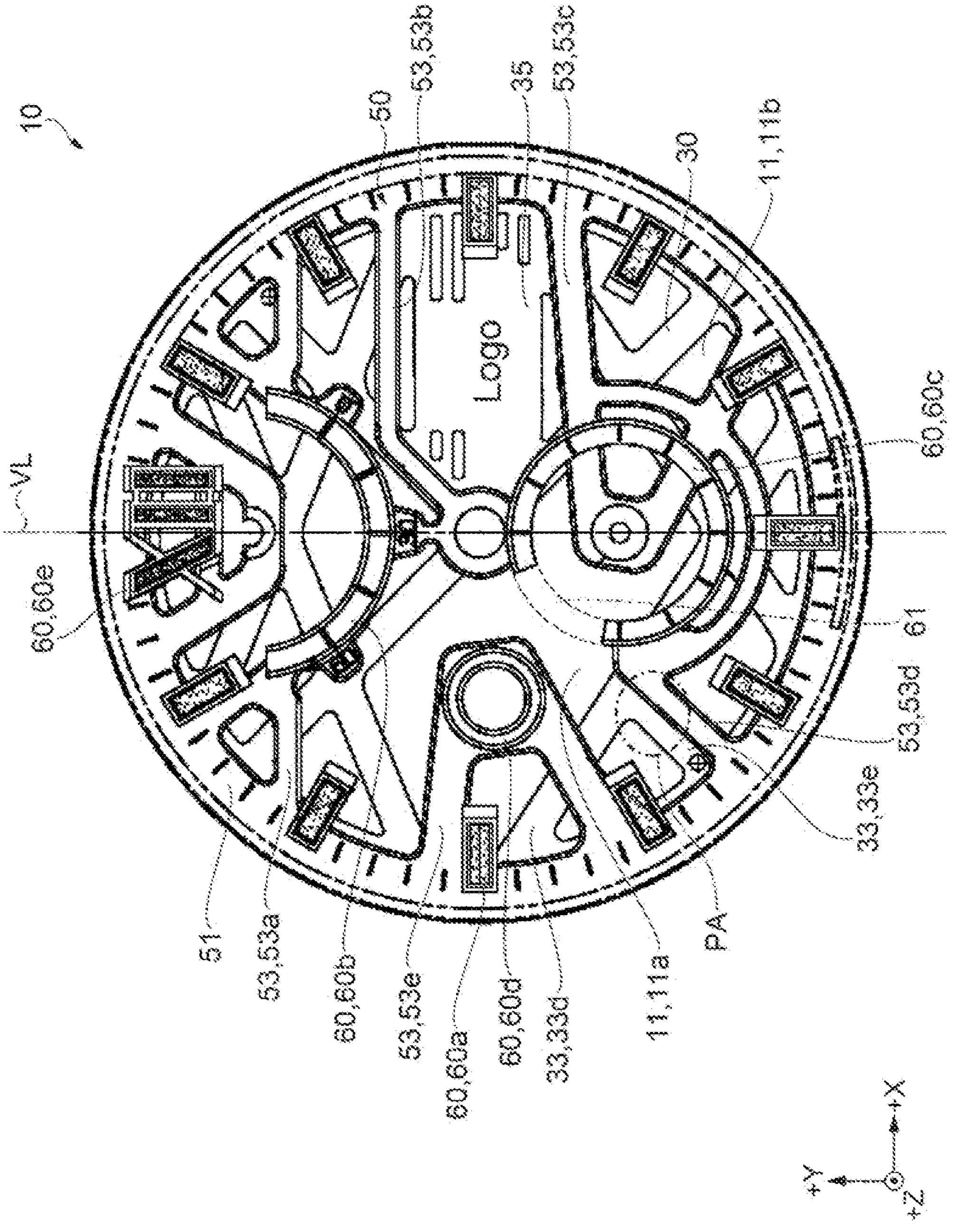
FIG. 7 is a diagram illustrating a schematic configuration of a dial.

FIG. 7 illustrates a schematic configuration of the dial 10. FIG. 7 is a diagram of the dial 10 viewed from the +Z direction. FIG. 7 illustrates the dial 10 in a position installed on the timepiece 1. FIG. 7 illustrates the decorative dial 30, the parts support plate 50, and a plurality of the functional parts 60.

The dial 10 has the decorative dial 30 and the parts support plate 50 disposed on the decorative dial 30. The decorative dial 30 and the parts support plate 50 are attached by an engaging mechanism (not illustrated). An example of the engaging mechanism includes an engaging member and a receiving portion. The engaging member is provided on the decorative dial while the receiving portion is provided on the parts support plate 50; or, the engaging member is provided on the parts support plate 50 while the receiving portion is provided on the decorative dial 30. With the engaging member and the receiving portion engaged, the parts support plate 50 is joined to the decorative dial 30. The dial 10 has a configuration in which a part of the decorative dial 30 is visible from the +Z direction. With the decorative dial 30 and the parts support plate 50 visibly disposed, the perceived depth of the dial 10 is improved.

The plurality of the functional parts 60 are disposed on the parts support plate 50. The functional part 60 is formed separately from the parts support plate 50. The functional part 60 is supported by the parts support plate 50. The functional part 60 is attached to the parts support plate 50 by an attachment mechanism (not illustrated). An example of the attachment mechanism includes an attachment protrusion and a hole. The attachment protrusion is provided on the functional part 60 while the hole is provided on the parts support plate 50; or, the attachment protrusion is provided on the parts support plate 50 while the hole is provided on the functional part 60. With the attachment protrusion attached to the hole, the functional part 60 is joined to the parts support plate 50. The functional part 60 may be joined to the parts support plate by an adhesive or the like.

The functional part 60 illustrated in FIG. 7 includes a plurality of the hour marks **60*a*, a power reserve mark 60*b*, a sub-dial mark 60*c*, a decorative ring 60*d*, and the numerical mark 60*e*. The functional part 60 is not limited to the hour mark 60*a*, the power reserve mark 60*b*, the sub-dial mark 60*c*, the decorative ring 60*d*, and the numerical mark 60*e***.

The hour mark **60*a* is an index indicating the hour or the minute. The plurality of the hour marks 60*a* are supported by the parts support plate 50. The hour mark 60*a* projects from and is supported by the parts support plate opening 57 of the parts support plate 50. The hour mark 60*a* may be supported by the bridge 53**.

The power reserve mark **60*b* is an indicator of the remaining power reserve of the timepiece 1. The power reserve mark 60*b* is supported by the first bridge 53*a* at the 12 o'clock position. The power reserve mark 60*b*** is disposed at the 12 o'clock position.

The sub-dial mark **60*c* displays a seconds indicator related to the seconds hand 7. The sub-dial mark 60*c* is supported by the third bridge 53*c* at the 6 o'clock position. The sub-dial mark 60*c* is disposed at the 6 o'clock position. The sub-dial mark 60*c* corresponds to an example of a sub-dial ring. The sub-dial mark 60*c* corresponds to an example of a seconds dial ring. The third bridge 53*c*** corresponds to an example of a support member.

The sub-dial mark **60*c* is formed in a ring shape. The sub-dial mark 60*c* is provided with a visual recognition portion 61. The visual recognition portion 61 is formed by cutting out a part of the sub-dial mark 60*c*. The visual recognition portion 61 is provided at a position in the +Z direction of the escape wheel and pinion 23. The visual recognition portion 61 is provided at a position above and overlapping the escape wheel and pinion 23 in the +Z direction of the escape wheel and pinion 23. The visual recognition portion 61 corresponds to an example of a cut-out portion. The position above corresponds to an example of an overlapping position. The position where the visual recognition portion 61 is provided is not limited to being in the +Z direction of the escape wheel and pinion 23. When a timepiece interior component that is visible and that is not the escape wheel and pinion 23 is positioned in the −Z direction of the sub-dial mark 60*c*, the visual recognition portion 61** may be provided at a position in the +Z direction of that timepiece interior component.

The sub-dial mark 60*c* is supported by the third bridge 53*c* at the 6 o'clock position, but is not limited to this configuration. The sub-dial mark 60*c* is preferably supported by the third bridge 53*c* and the fourth bridge 53*d*. The sub-dial mark 60*c* is provided with a visual recognition portion 61. With the sub-dial mark 60*c* supported by the third bridge 53*c* and the fourth bridge 53*d*, the sub-dial mark 60*c* is less likely to bend because the visual recognition portion 61 is provided. The sub-dial mark 60*c* may be supported by the second bridge 53*b* and the third bridge 53*c*. The sub-dial mark 60*c* is more preferably supported by the second bridge 53*b*, the third bridge 53*c*, and the fourth bridge 53*d*. With the sub-dial mark 60*c* supported by three or more of the bridges 53, the sub-dial mark 60*c* is even less likely to bend because of the visual recognition portion 61. The second bridge 53*b* or the fourth bridge 53*d* corresponds to an example of a second support member.

The decorative ring 60*d* is a member displaying the cap jewel 25. The decorative ring 60*d* is supported by the fifth bridge 53*e* at the 9 o'clock position. The decorative ring 60*d* is disposed at the 9 o'clock position. The decorative ring 60*d* is attached to the attachment hole 59 of the fifth bridge 53*e*. The inner region of the decorative ring 60*d* is a hole and is configured to be visible in the −Z direction. The user can visually recognize the cap jewel 25 through the hole in the decorative ring 60*d*. The decorative ring 60*d* corresponds to an example of a third part. The decorative ring 60*d* corresponds to an example of a decorative part. The fifth bridge 53*e* corresponds to an example of a third support member.

The numerical mark 60*e* is an index indicating the hour or the minute. The numerical mark 60*e* is a type of the hour mark 60*a*. The numerical mark 60*e* is an index indicating 12 o'clock. The numerical mark 60*e* is supported by the parts support plate 50. The numerical mark 60*e* projects from and is supported by the parts support plate opening 57 of the parts support plate 50. The numerical mark 60*e* may be supported by the bridge 53.

The escape wheel and pinion 23 has a diameter that is greater than the length of the hour mark 60*a* in the longitudinal direction and greater than the length of the numerical mark 60*e* in the longitudinal direction. Meanwhile, the escape wheel and pinion 23 has a volume that is less than the volume of the hour mark 60*a* and less than the volume of the numerical mark 60*e*. With the diameter and the volume of the escape wheel and pinion 23 satisfying such relationships, the hour mark 60*a* and the numerical mark 60*e* are more easily visible than the escape wheel and pinion 23, which improves the practicality while allowing the escape wheel and pinion 23 to be reliably visible. As a result, the movement of the escape wheel and pinion 23 is easily confirmed.

As illustrated in FIG. 7, when the dial 10 is viewed from the +Z direction, the user can visually recognize the beam members 33 and the bridges 53. The beam members 33 are provided at positions overlapping and not overlapping the bridges 53 disposed in the +Z direction. With the beam members 33 provided at positions overlapping and not overlapping the bridges 53, the dial 10 has improved design variation.

FIG. 7 illustrates a partial area PA of the dial 10. In the partial area PA, the fourth bridge 53*d* and the fifth beam member 33*e* are disposed at positions overlapping each other along the Z-axis. The beam member width Wa of the fifth beam member 33*e* is greater than the bridge width Wb of the fourth bridge 53*d*. With the fifth beam member 33*e* visibly disposed in the −Z direction of the fourth bridge 53*d*, the presence of the fourth bridge 53*d* is emphasized.

The bridge width Wb of the bridge 53 may be greater than the beam member width Wa of the beam member 33. In this way, the beam member 33 can have a configuration in which the beam member 33 is hidden by the bridge 53 when the user views the dial 10 from the +Z direction. With the bridge width Wb of the bridge 53 being greater than the beam member width Wa of the beam member 33, the dial 10 has an improved three-dimensional effect.

When the decorative dial 30 and the parts support plate 50 overlap along the Z-axis, a dial opening 11 is formed in the dial 10. The dial opening 11 is an opening portion penetrating the dial 10. The dial opening 11 is an area where the decorative dial opening 37 and the parts support plate opening 57 overlap along the Z-axis. The dial opening 11 is an area in which the beam member 33 and the bridge 53 are not disposed along the Z-axis. The beam member 33 and the bridge 53 are provided at positions different from the position of the dial opening 11. With the dial opening 11 formed, the movement 20 or the inside of the movement 20 is visible. When viewing the timepiece 1 from the +Z direction, the user can visually recognize the movement opening 29 or the movement cover 27 that are located in the −Z direction of the dial opening 11. The user can visually recognize timepiece interior components located in the −Z direction of the dial opening 11, such as the balance with hairspring 21, the escape wheel and pinion 23, and the cap jewel 25.

The dial opening 11 is divided into a plurality of areas. In an exampled illustrated in FIG. 7, a plurality of the dial openings 11 includes a first dial opening area 11*a* and a second dial opening area 11*b*.

The first dial opening area 11*a* is provided at a position in the +Z direction of the movement opening 29. A part of the movement opening 29 is located at a position in the −Z direction of the first dial opening area 11*a*. The first dial opening area 11*a* is provided in an area including the 9 o'clock position of the timepiece 1. The first dial opening area 11*a* is provided at a position in the +Z direction of a part of the balance with hairspring 21 and a part of the escape wheel and pinion 23 that are disposed in the movement opening 29. The first dial opening area 11*a* includes a position above the escape wheel and pinion 23. The user can visually recognize a part of the balance with hairspring 21 and a part of the escape wheel and pinion 23 from the +Z direction through the first dial opening area 11*a*. The first dial opening area 11*a* is provided at a position in the −Z direction of the decorative ring 60*d*. The user can visually recognize the cap jewel 25 through the hole of the decorative ring 60*d* and the first dial opening area 11*a*.

The second dial opening area 11*b* is provided at a position in the +Z direction of the movement cover 27. The user can visually recognize the movement cover 27 through the second dial opening area 11*b*. The user can visually recognize timepiece interior components disposed inside the movement 20 and the movement cover 27 through the dial opening 11. The user can feel a three-dimensional effect from the dial 10.

The image display plate 35 of the decorative dial 30 is disposed at a position in the −Z direction of the first parts support plate opening area 57*a*. The image display plate 35 is visible to the user through the first parts support plate opening area 57*a*. The image display plate 35 is disposed at a 3 o'clock position of the dial 10. The 3 o'clock position is an area in the +X direction of the imaginary vertical line VL defined by an imaginary line inclined at +45° to an imaginary horizontal line and an imaginary line inclined at −45° to the imaginary horizontal line, the imaginary horizontal line being a line that passes through the hour hand shaft 3*a* and that is perpendicular to the imaginary vertical line VL.

The timepiece 1 includes the movement 20 having the escape wheel and pinion 23 that is one of the timepiece interior components, the hour hand 3 that has a predetermined hour hand length and that is driven by the movement 20, the seconds hand 7 that has a seconds hand length greater than the hour hand length and that is driven by the movement 20, the parts support plate 50 provided on the movement 20, and the dial 10 having the sub-dial mark 60*c* that displays an indicator related to the seconds hand 7. The parts support plate 50 includes the parts support plate ring 51 provided with the parts support plate opening 57 and the bridge 53 coupled to the parts support plate inner circumferential surface 51*a* of the parts support plate ring 51. The escape wheel and pinion 23 is disposed in the −Z direction of the parts support plate opening 57. The sub-dial mark 60*c* is disposed on the bridge 53. The sub-dial mark 60*c* has the visual recognition portion 61 at a position above and overlapping the escape wheel and pinion 23 in the +Z direction of the escape wheel and pinion 23.

The parts support plate 50 provided with the parts support plate opening 57 is formed separate from the sub-dial mark 60*c*. This reduces the possibility that the sub-dial mark 60*c* is excessively cut out by the parts support plate opening 57. With the visual recognition portion 61 provided in the sub-dial mark 60*c*, the user can easily visually recognize the escapement, which includes the escape wheel and pinion 23 that is one of the timepiece interior components. Also, with the sub-dial mark 60*c* provided on the parts support plate 50, the user can easily see the indicator of the sub-dial mark 60*c*. As such, the user can easily visually recognize the escape wheel and pinion 23 and the indicator displayed on the sub-dial mark 60*c*.

The movement 20 includes the balance with hairspring 21 disposed in the −Z direction of the parts support plate opening 57 and the seconds hand shaft 7*a* that supports the seconds hand 7. The sub-dial mark 60*c* is disposed at the 6 o'clock position. The balance with hairspring 21 is disposed at the 9 o'clock position. In plan view viewed from the +Z direction, the escape wheel and pinion 23 is disposed between the seconds hand shaft 7*a* and the balance with hairspring 21.

With the balance with hairspring 21, the sub-dial mark 60*c*, and the escape wheel and pinion 23 disposed at their respective positions, the user can easily visually recognize the balance with hairspring 21, the sub-dial mark 60*c*, and the escape wheel and pinion 23.

The dial 10 has the decorative dial 30 between the parts support plate 50 and the movement 20. The decorative dial 30 has the decorative dial ring 31 provided with the decorative dial opening 37 and the beam member 33 coupled to the decorative dial inner circumferential surface 31*a* of the decorative dial ring 31. The beam member 33 is disposed at a position different from the position above the escape wheel and pinion 23.

With the decorative dial 30 provided, the design of the dial 10 becomes intricate, and the dial 10 has an improved design. With the beam member 33 disposed at a position different from the position above the escape wheel and pinion 23, the user can visually recognize the escape wheel and pinion 23.

The timepiece 1 illustrated in FIG. 1 has a configuration in which the seconds hand 7 and the sub-dial mark 60*c* are disposed at the 6 o'clock position, but the timepiece 1 is not limited to this configuration. The 6 o'clock position of the timepiece 1 may be provided with the power reserve hand 9 and the power reserve mark 60*b*. When the power reserve hand 9 and the power reserve mark 60*b* are disposed at the 6 o'clock position, the power reserve hand 9 corresponds to an example of a second hand while the power reserve mark 60*b* corresponds to an example of a sub-dial ring. The power reserve mark 60*b* is provided with the visual recognition portion 61 at a position above timepiece interior components such as the escape wheel and pinion 23. When disposed at the 6 o'clock position, the power reserve mark 60*b* is supported by the third bridge 53*c*.

A date indicating hand (not illustrated) may be provided instead of the seconds hand 7. The date indicating hand is a hand indicating the date. The date indicating hand has a length that is less than the hour hand length. When the date indicating hand is provided at the 6 o'clock position, a date indicator mark related to the date indicating hand is disposed instead of the sub-dial mark 60*c*. The date indicator mark displays a day indicator. The date indicator mark is provided with the visual recognition portion 61 at a position above the escape wheel and pinion 23. The date indicator mark is supported by the third bridge 53*c*. The date indicating hand corresponds to an example of a second hand. The date indicator mark corresponds to an example of a sub-dial ring.

A chronograph seconds hand or a chronograph minute hand may be provided instead of the seconds hand 7. The chronograph seconds hand and the chronograph minute hand are hands standing by at predetermined positions. The chronograph seconds hand and the chronograph minute hand are actuated when measurement is instructed to start. When the chronograph seconds hand is provided, a chronograph seconds hand indicator mark related to the chronograph seconds hand is disposed instead of the sub-dial mark 60*c*. When the chronograph minute hand is provided, a chronograph minute hand indicator mark related to the chronograph minute hand is disposed instead of the sub-dial mark 60*c*. The chronograph seconds hand indicator mark displays a seconds indicator. The chronograph minute hand indicator mark displays a minute indicator. In the chronograph seconds hand indicator mark and the chronograph minute hand indicator mark, the visual recognition portion 61 is provided at a position above the escape wheel and pinion 23. The chronograph seconds hand indicator mark is supported by the third bridge 53*c*. The chronograph minute hand indicator mark is supported by the third bridge 53*c*. The chronograph seconds hand and the chronograph minute hand correspond to an example of a second hand. The chronograph seconds hand indicator mark and the chronograph minute hand indicator mark correspond to an example of a sub-dial ring.

A day indicating hand (not illustrated) may be provided instead of the seconds hand 7. The day indicating hand is a hand indicating the day of the week. The day indicating hand has a length that is less than the hour hand length. When the day indicating hand is provided at the 6 o'clock position, a day indicator mark related to the day indicating hand is disposed instead of the sub-dial mark 60*c*. The day indicator mark displays an indicator related to the day of the week. The day indicator mark is provided with the visual recognition portion 61 at a position above the escape wheel and pinion 23. The day indicator mark is supported by the third bridge 53*c*. The day indicating hand corresponds to an example of a second hand. The day indicator mark corresponds to an example of a sub-dial ring.

The hand disposed at the 6 o'clock position is preferably the seconds hand 7, and the sub-dial mark 60*c* is preferably the functional part 60 that displays the seconds indicator.

The seconds hand 7 stops on the escape wheel and pinion 23 for a short time, and thus the visibility of the escape wheel and pinion 23 is not likely to decrease.

What is claimed is:

1. A timepiece comprising:
a movement having a timepiece component,
a first hand that has a first length and that is driven by the movement,
a second hand that has a second length less than the first length and that is driven by the movement, and
a dial including a support plate provided on the movement and a sub-dial ring that displays an indicator related to the second hand, wherein
the support plate has a support plate ring member that is provided with a support plate opening and a support member that is coupled to the support plate inner circumference of the support plate ring member;
the timepiece component is disposed below the support plate opening;
the sub-dial ring is disposed on the support member; and
a cut-out portion is provided at an overlapping position that is above the timepiece component and that overlaps the timepiece component.

2. The timepiece according to claim 1, wherein
the support plate has a second support member, and
the sub-dial ring is supported by the support member and the second support member.

3. The timepiece according to claim 1, wherein
the second hand is a seconds hand, and
the sub-dial ring is a seconds dial ring that displays a seconds indicator as the indicator.

4. The timepiece according to claim 3, wherein
the timepiece component is an escape wheel and pinion including a silicon oxide layer.

5. The timepiece according to claim 4, wherein
the movement has a balance with hairspring disposed below the support plate opening, and a seconds hand shaft supporting the seconds hand;
the seconds dial ring is disposed at a 6 o'clock position;
the balance with hairspring is disposed at a 9 o'clock position; and
the escape wheel and pinion is disposed between the seconds hand shaft and the balance with hairspring in plan view that is viewed from above.

6. The timepiece according to claim 1, wherein
the first hand is disposed above the support plate; and
the first hand has a window in an area overlapping the timepiece component.

7. The timepiece according to claim 1, wherein
the dial has a decorative plate between the support plate and the movement,
the decorative plate has a decorative plate ring member provided with a decorative plate opening, and a plate member coupled to a decorative plate inner circumference of the decorative plate ring member, and
the plate member is disposed at a position different from the overlapping position.

* * * * *